June 8, 1965     L. R. CAPPEL     3,187,721
ILLUMINATED TABLE TYPE RABBIT IMMOBILIZER
Filed May 14, 1963     3 Sheets-Sheet 1
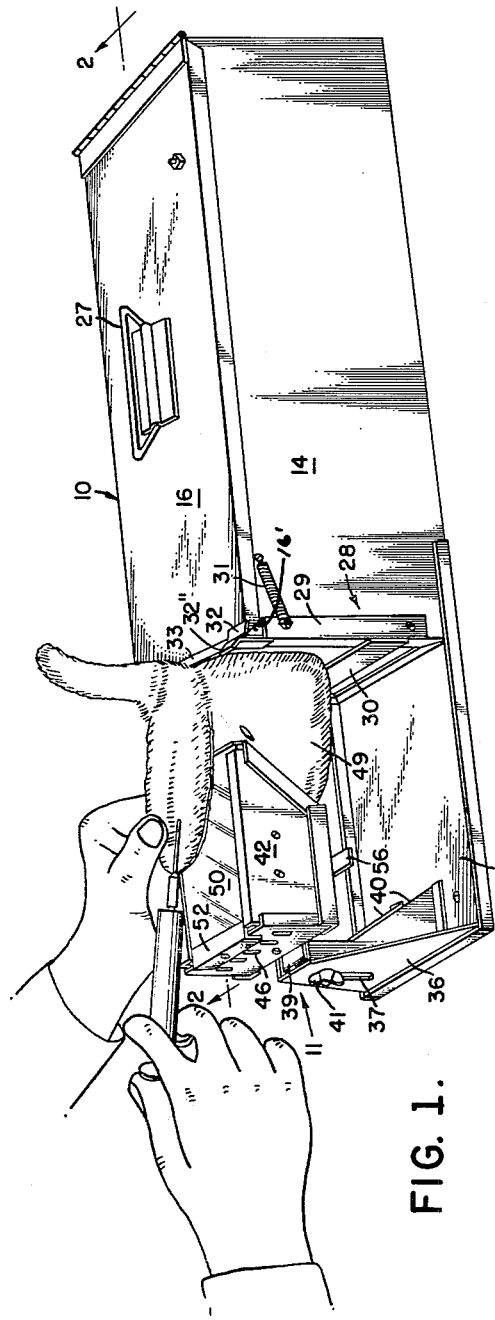
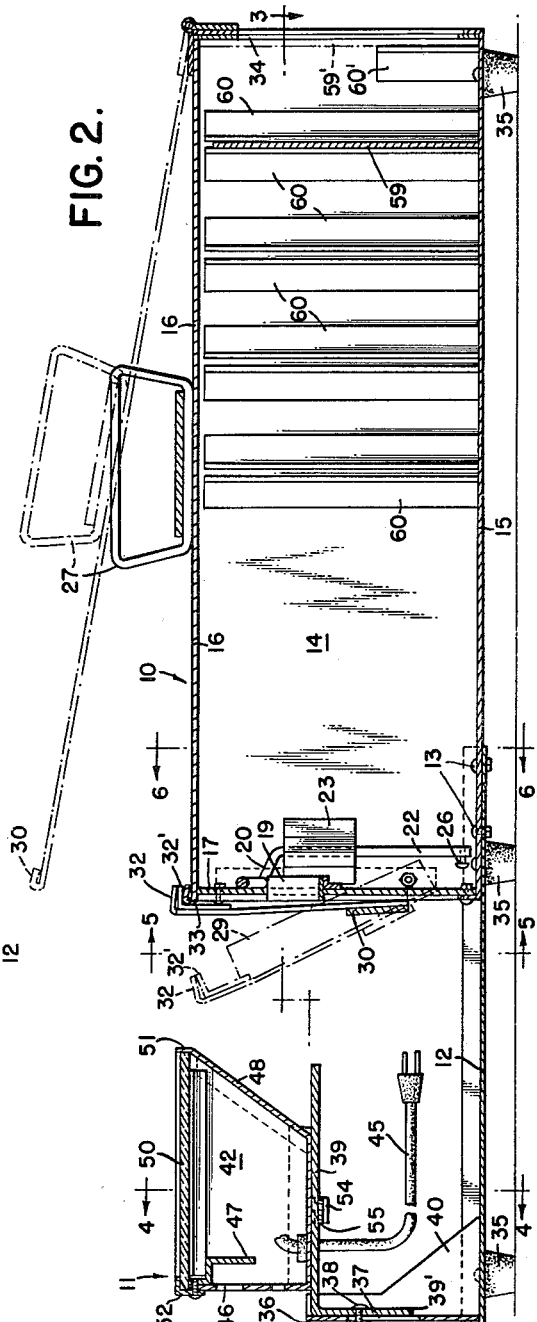
INVENTOR.
LEONA R. CAPPEL
BY
*Garvey & Garvey*
ATTORNEYS June 8, 1965 L. R. CAPPEL 3,187,721
ILLUMINATED TABLE TYPE RABBIT IMMOBILIZER
Filed May 14, 1963 3 Sheets-Sheet 2

INVENTOR
LEONA R. CAPPEL

BY *Garney & Garney*
ATTORNEYS

June 8, 1965 L. R. CAPPEL 3,187,721
ILLUMINATED TABLE TYPE RABBIT IMMOBILIZER
Filed May 14, 1963 3 Sheets-Sheet 3
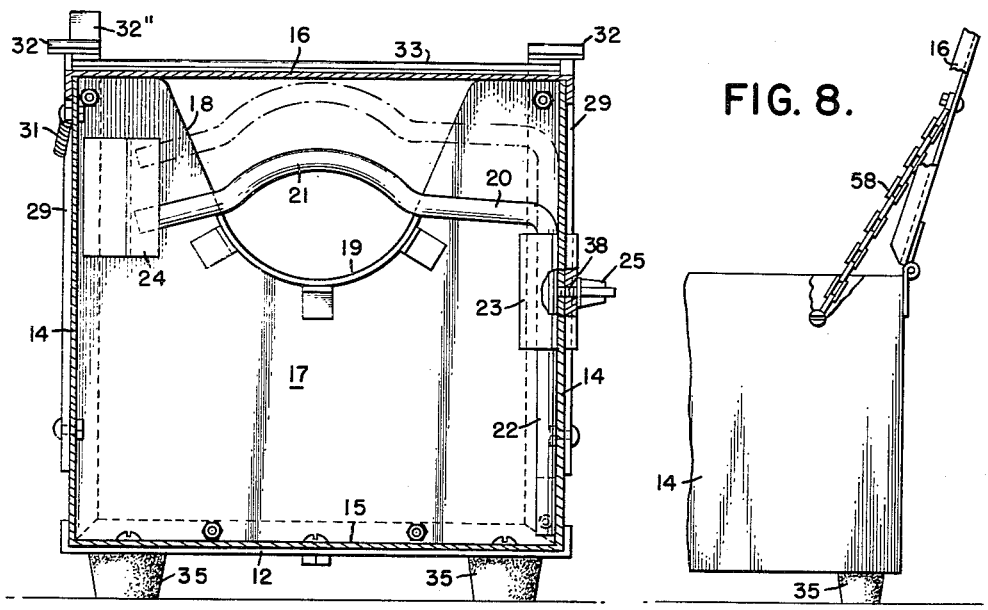
FIG. 6.
FIG. 8.
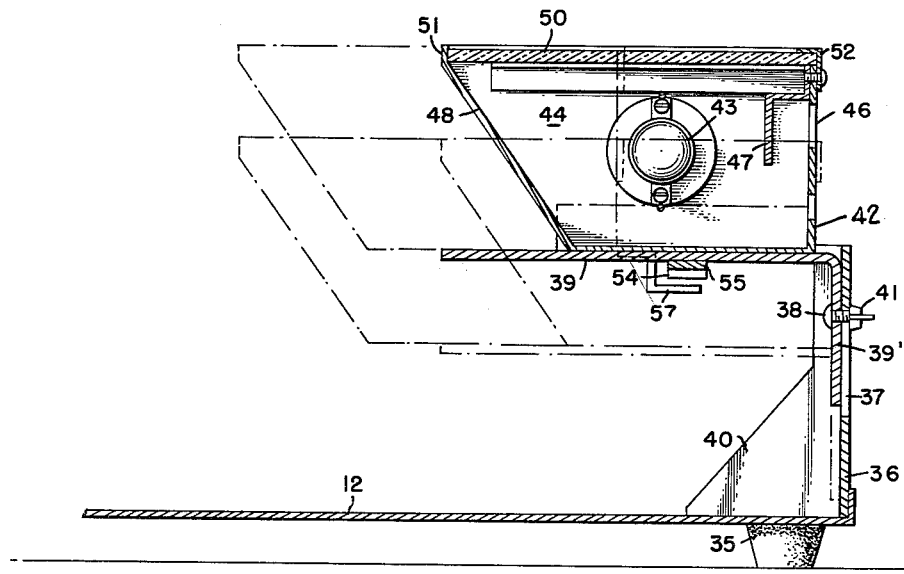
FIG. 7.
INVENTOR
LEONA R. CAPPEL
BY *Garvey & Garvey*
ATTORNEYS

# United States Patent Office 3,187,721
Patented June 8, 1965

3,187,721
ILLUMINATED TABLE TYPE RABBIT
IMMOBILIZER
Leona R. Cappel, 310 N. High St., West Chester, Pa.
Filed May 14, 1963, Ser. No. 280,255
3 Claims. (Cl. 119—103)

This invention is a rabbit immobilizer to restrain rabbits while injecting fluid into an ear vein or veins, and for rectal pyrogen testing, following ear injecting.

Objects of the invention are to provide an assembly or entity which combines a rabbit immobilizer with an illuminating support which coacts to permit injecting a selected fluid into a vein in the ear of a rabbit, the illuminating agent of the support being strategically positioned, to project light rays through the ear, while the latter is retained in a flat position on the support; to provide an illuminating support which is both horizontally and vertically adjustable, to obtain optimum results with different sized rabbits; to provide an illuminating support in which the light source of the assembly is removable to permit sterilization, of the residual entity by steam; to provide an assembly which may conveniently house a rabbit of any size and weight from approximately one and one half pounds to fifteen pounds, this including an adjustment for neck engagement to humanely immobilize the head during ear injection and pyrogen testing and to provide an entity in which the rabbit-immobilizing housing is preferably made of stainless steel, for ease in cleaning and sterilizing.

Other objects of the invention will be manifest from the following description of the present preferred form of the invention, taken in connection with the accompanying drawings, wherein:

FIG. 1 is a perspective view of a rabbit immobilizer assembly constructed in accordance with this invention, illustrating its application;

FIG. 2 is a longitudinal sectional view taken on the line 2—2 of FIG. 1, looking in the direction of the arrows, dotted line being used to show the hinged top of the rabbit housing, partly open;

FIG. 6 is a similar view on the line 6—6 of FIG. 2, looking in the direction of the arrows, showing the inside of the front closure and the manner of engaging the housing-carried neck swing bar therewith when the rabbit head is in the front closure vent;

FIG. 7 is a vertical sectional view, taken on the line 7—7 of FIG. 4, looking in the direction of the arrows, showing the construction of the illuminating support inside and outside; and FIG. 8 is a fragmentary side elevational view of the immobilizer housing showing the hinged top open.

The immobilizer entity includes the combination of a rabbit housing 10 and an illuminating housing support 11, the support embodying a base 12. The aft end of the base 12 is detachably engaged, as shown at 13, to the bottom of the front end of housing 10, illustrated to advantage in FIG. 2.

Figure 5:
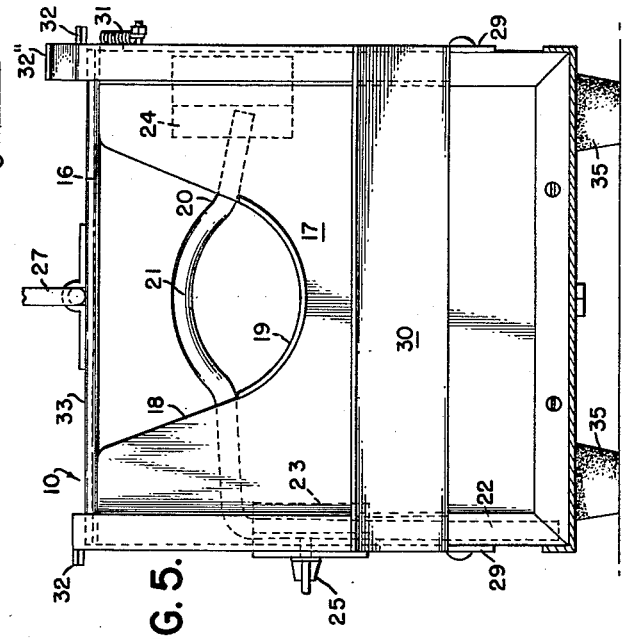
FIG. 5 is a vertical sectional view taken on the line 5—5 of FIG. 2, showing to advantage the outside of the front closure of the housing, with head vent and neck-securing bar.

The housing 10 is elongated, as shown in the drawings, comprising side walls 14, bottom 15, hinged top or lid 16, and removable front wall 17. Said front wall 17 is provided with a rabbit head vent or recess 18, the bottom of which is equipped with a relatively broad throat-embracing cradle 19. A vertically adjustable neck-securing bar 20 is strategically positioned in the housing 10 to permit a neck-contoured part 21 thereof to be brought into engagement with the neck of the rabbit immediately in back of the head. One end 22 of the neck bar is slidably mounted in a guide sleeve 23, secured to the inner face of one of the housing side walls 14. The opposite end of the bar is engageable behind a keeper plate 24, on the inner face of the front wall 17, when the bar is in an operative position, as advantageously shown in FIGS. 2 and 5. The end 22 is secured in a predetermined adjusted position by a wing nut 25. Casual displacement of the end 22 of the bar, from the guide sleeve 23, is prevented by an abutment 26. The hinged cover 16 may be conveniently opened, at the option of the user, by handle 27, after the fashion shown in FIG. 2. Since cover 16 is normally held in a closed position, the handle 27 may also be used for carrying the immobilizer assembly. The means for holding the cover in a closed position is a hinged or pivoted spring-loaded gate entity 28. The gate entity 28 comprises sides 29, cross plate 30 and spring 31, which plate spans the distance between the sides at the lower ends of the latter, as shown to advantage in FIGS. 1 and 5, and is fixedly secured thereto. One end of the coil spring 31 is secured to one of the sides 29, and the other end anchored on a side 14 of the housing, as shown in FIG. 1. The sides 29 are angle members, the top of each of which has its side removed to provide a front clip member, the top of which is bent at right angles, as indicated at 32, with the free end slanted downwardly into close proximity with an auxiliary clip 32'. Clips 32 and 32' are adapted to snap over a bead 33 which is formed by reversely folding the forward terminal of the lid 16, as advantageously shown in FIG. 2. When the lid is permitted to gravitate into engagement with the downwardly slanted clip 32, the weight of the lid causes the gate entity to be pushed outwardly against the resistance of the spring 31. Recoil of the spring causes the entity to be automatically locked into the position advantageously shown in FIG. 2. A finger release member 32'' is engaged with one pair of clips 32 and 32' to move the gate entity 28 away from the housing, into the position shown in dotted lines in FIG. 2.

The back of the housing is open, as indicated at 34, and of sufficient size for access and egress of the arm of an operator, when rectal pyrogen tests are made. Preferably, the housing is equipped, at predetermined points, with rubber feet 35, mounted on the housing bottom 15.

Figure 3:
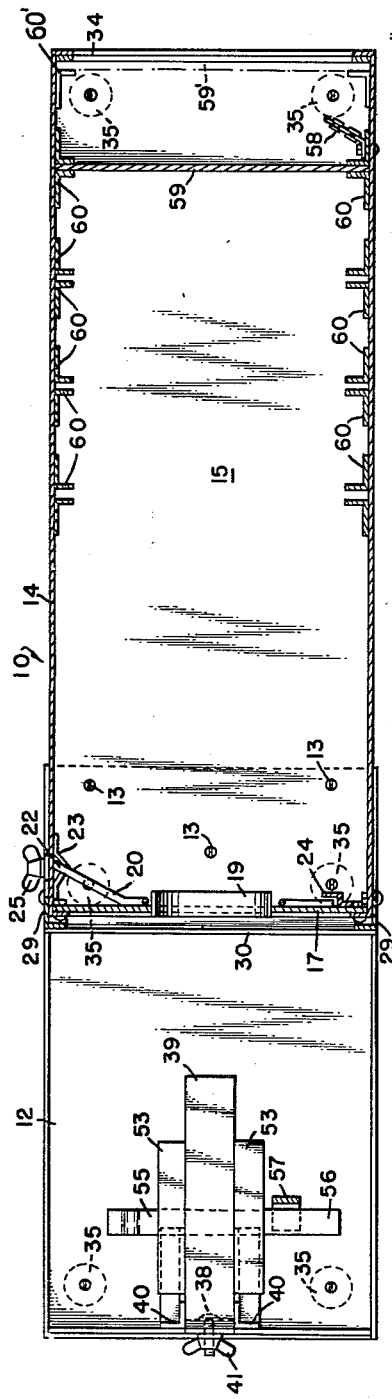
FIG. 3 is a horizontal sectional view taken on the line 3—3 of FIG. 2, looking in the direction of the arrows.
Figure 4:
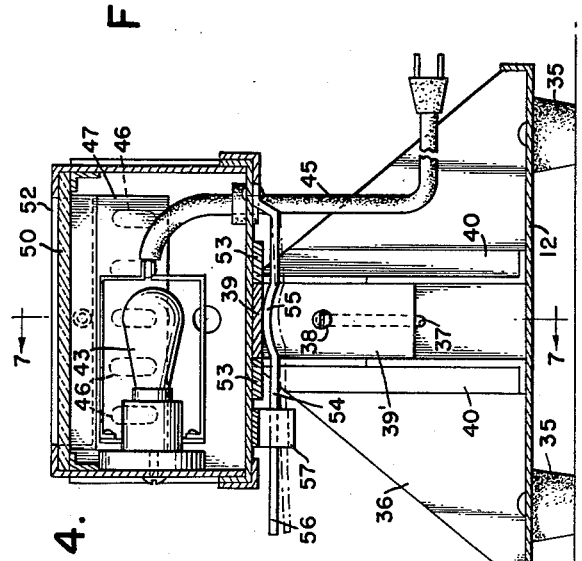
FIG. 4 is a vertical sectional view taken on the line 4—4 of FIG. 3, looking in the direction of the arrows and showing to advantage the illuminated support of the immobilizer assembly.

The illuminating housing support, in addition to the base 12, includes a vertically extending plate 36 provided with an elongated slot 37 adapted for the reception of a screw bolt 38 carried by one end of supporting shelf 39. The top of the shelf 39 is bent at right angles and elongated for a purpose presently described. The vertical portion 39' of the shelf 39 is slidably mounted between complemental guide plates 40, secured to the base 12 in any suitable manner. The shelf 39 is vertically movable as an entity, in the slot 37, and may be held in any position of adjustment by a wing nut 41 mounted on the bolt 38. The shelf 39 is adapted to slidably receive thereon, an illuminating housing 42. An illuminating agent 43 may be positioned on a side wall 44 of the housing 42 and a plug-in electrical cable 45 operatively engaged therewith in a conventional manner. Ventilating openings 46 are formed in the front wall of the illuminating housing, which openings are shrouded in a suitable manner, as indicated at 47, in spaced relation to the front wall. The rear wall 48 of the housing is slanted, as advantageously illustrated in FIGS. 1 and 7, to conform substantially to the shape of the fore part of the animal's face, indicated at 49, after the manner shown in FIG. 1. When the rabbit is in this position, an ear of the rabbit is readily accessible to be laid on the top of the housing, which is preferably a translucent pane 50. The pane is slidably mounted in suitable guides formed on the top of the housing. Preferably, the pane is slid from front to back into engagement with an extension 51 formed by extending the rear wall 48 upwardly, as shown in FIG. 2. The pane is held from casual displacement by detachable angle plate 52. The housing 42 is slidably mounted on the shelf 39 between guides 53 as shown in FIGS. 3 and 4. This prevents lateral displacement of the housing on the shelf, but permits facile horizontal movement. The shelf 39 is held in position by a locking bar 54, an intermediate part 55 of which is bowed upwardly for yieldable engagement with the bottom of the shelf 39. This assures retention of the housing in any selected position of adjustment. The free end of the locking bar 54 is extended to provide a finger-engaging extension 56 to facilitate horizontal movement of the housing on the shelf, at the option of the user, notwithstanding the frictional engagement of the bowed portion 55 of the locking bar with the shelf 39. Downward movement of the free end of the locking bar is limited by an abutment 57.

The hinged top 16 is adapted to be swung all the way open, into the position shown in FIG. 8, in order to permit the rabbit to be bodily deposited in the housing 10. To hold the top 16 in the desired position, where it will be readily accessible to the operator, after the rabbit has been deposited, a chain 58 is employed, one end of which is secured to one of the side walls 14, the opposite end being secured to the top 16, preferably at or about the location shown in FIG. 8.

In view of the fact that the device of this invention is adapted for use with rabbits varying in weight from one and one half pounds to fifteen pounds, a partition 59 is employed, which may be selectively mounted in any pair of guides 60 mounted on the inner faces of the side walls 14 as shown in FIGS. 2 and 3. When a small rabbit is used, the partition 59 is slid into the first pair of guides 60, aft of the front wall 17. In this way, the rabbit is held from endwise movement in the housing, when the head is mounted in the vent or recess 18, substantially as shown in FIG. 1. Of course, as larger rabbits are employed, the partition 59 is moved farther and farther back in the housing, in an obvious manner. However, with the largest sized rabbits, it is necessary to cover the opening, indicated at 34, in the back of the housing, and this is done by inserting a partition, as shown at 59', between the closed portion of the back of the housing, in relatively short guides 60'.

To mobilize the head of the rabbit, the bar 20 is used. When the lid 16 is in an open position, the upper end of the bar 20 is moved laterally over the top of one of the sides 14. Usually, the rabbit is deposited in the housing by holding the rabbit's ears with one hand, and the scruff of the rabbit, with the other hand. When so deposited, the upper end of the bar 20 is then pivoted around until it lies immediately above the rabbit, in back of the ears, and is permitted to gravitate, or is moved to a point where the neck contour part 21 of the bar is in engagement with the rabbit. At this point, the wing nut 41 is rotated, so as to feed the bolt 38 into contact with the end 22, as shown in FIG. 6. The lid 16 is then closed, and the illuminating housing 42 is adjusted into position until the inclined rear wall 48 is in contiguity with the face of the rabbit, as shown in FIG. 1. When in this position, an ear of the rabbit may then be laid flat, or substantially flat, on the translucent pane 50, so that the ear veins are clearly visible to permit the operator to inject a selected fluid thereinto. The approximate procedure here followed is as illustrated in FIG. 1 of the drawings.

When rectal pyrogen testing is to be pursued, the partition 59 is removed through the top of the housing and the lid 16 closed. This is followed by insertion of the hand of the operator, through the opening 34 in the back of the housing, to permit the thermometer to be first inserted into the animal, and after the desired lapse of time, removed.

The device of this invention lends itself to expeditious cleaning and sterilization, in view of the fact that the rabbit housing is made of stainless steel or other suitable material, which will withstand the temperature of steam and other cleansing and sterilizing agents. When the entity is to be sterilized, the illuminating housing 42 is removed by moving the illuminating housing toward the rabbit housing, until the locking bar 54 clears the end of the shelf 39. As advantageously illustrated in FIG. 7, the illuminating housing may be vertically adjusted to the extreme height shown in FIG. 7, and lowered to the position indicated by the dotted lines. Furthermore, horizontal adjustment is possible, to permit the illuminating housing to be moved along the shelf 39 to the positions also shown in dotted lines in FIG. 7.

It is apparent from the above, that the lid 16 is automatically locked when it gravitates into engagement with the clips 32 and 32'. In this way, the clips are first tripped and then return to the position shown in FIG. 1. This action is made positive by inclining the front terminal of a side of the lid, as indicated at 16'. This terminal wipes over the inclined top of clip 32. Experiments have established the practicability of this arrangement, but I am aware that other means may be here employed to accomplish the same result, within the scope of the appended claims. The same applies to other structural features of this invention used to show one practical embodiment of the invention. I am also aware that various structural changes may be made, throughout the specification, within the scope of the appended claims, without departing from the spirit and teaching of this invention.

What is claimed is:

1. A rabbit immobilizer comprising a housing, the housing being open at one end to provide a space through which the head of the rabbit may project, the top of the housing body being open to permit the rabbit to be deposited bodily into the housing, a neck-securing bar slidably mounted in the front of the housing and adapted to gravitate into engagement with the neck of the rabbit while the head is projected through the front opening of the housing, making the ears available for hypodermic injections, a lid hinged to one end of the housing and yieldably engageable, into a locking position, with the opposite end of the housing to hold the rabbit immobile, and means for holding the hinged lid in a locked position, said means comprising a spring-loaded gate entity with clips normally extended over and in engagement with the top of the housing, the clips being automatically displaced when the front free end of the housing gravitates into engagement therewith permitting said end to rest on the top of the housing beneath the clips, the latter being held from displacement by the springs of the entity, the entity being manually disengageable, against the resistance of the springs when the lid of the housing is being opened.

2. A rabbit immobilizer comprising a housing, the housing being open at one end to provide a space through which the head of the rabbit may project, the top of the housing body being open to permit the rabbit to be deposited bodily into the housing, a neck securing bar slidably mounted in the front of the housing and adapted to gravitate into engagement with the neck of the rabbit while the head is projected through the front opening of the housing, making the ears available for hypodermic injections, a lid hinged to one end of the housing and yieldably engageable, into a locking position, with the opposite end of the housing to hold the rabbit immobile, and an illuminating housing including a translucent top on which the ear of the rabbit is placed for detecting ear veins to facilitate hypodermic injections.

3. A rabbit immobilizer comprising a housing, the housing being open at one end to provide a space through which the head of the rabbit may project, the opposite end being an opening through which the rectal end of the rabbit is accessible, the top of the housing body being open to permit the rabbit to be deposited bodily into the housing, a neck securing bar slidably mounted in the front of the housing and adapted to gravitate into engagement with the neck of the rabbit while the head is projected through the front opening of the housing, making the ears available for hypodermic injections, while the rectum is held in accessible position for pyrogen testing and the like, an illuminating housing including a translucent top on which the ear of the rabbit is placed for detecting the ear veins to facilitate hypodermic injections, a lid hinged to one end of the housing and yieldably engageable, into a locking position, with the opposite end of the housing to hold the rabbit immobile, while the fore and/or aft parts of the rabbit are treated in a laboratory, and means for holding the hinged lid in a locked position, said means comprising a spring loaded gate entity with clips normally extended over and in engagement with the top of the housing, the clips being automatically displaced when the front free end of the housing gravitates into engagement therewith permitting said end to rest on the top of the housing beneath the clips, the latter being held from displacement by the springs of the entity, the entity being manually disengageable, against the resistance of the springs when the lid of the housing is being opened.

References Cited by the Examiner
UNITED STATES PATENTS

| | | | |
|---|---|---|---|
| 2,134,650 | 10/38 | Williams | 240—2 |
| 2,215,462 | 9/40 | Davidson et al. | 95—102 |
| 2,240,833 | 5/41 | Brockmeier | 108—23 |
| 2,328,471 | 8/43 | Leffel | 108—6 |
| 2,498,051 | 2/50 | Shipley | 119—99 |
| 2,650,567 | 9/53 | Whitworth | 119—99 |
| 2,786,449 | 3/57 | Dahlerup | 119—99 |
| 3,094,101 | 6/63 | Porter | 119—103 |
| 3,103,204 | 9/63 | Greene | 119—103 |

References Cited by the Applicant
UNITED STATES PATENTS

| | | |
|---|---|---|
| 1,114,094 | 10/14 | Apple. |
| 1,436,148 | 11/22 | Burris. |
| 1,956,499 | 4/34 | Dworetzky. |
| 2,279,012 | 4/42 | Packchanian. |
| 2,987,042 | 6/61 | Rothberg. |

SAMUEL KOREN, *Primary Examiner.*

ALDRICH F. MEDBERY, *Examiner.*